(12) United States Patent
Nishizono (10) Patent No.: US 7,990,134 B2
(45) Date of Patent: Aug. 2, 2011

(54) CORRECTING CIRCUIT, CORRECTING METHOD, AND SENSOR APPARATUS

(75) Inventor: Kazunori Nishizono, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 328 days.

(21) Appl. No.: 12/399,543

(22) Filed: Mar. 6, 2009

(65) Prior Publication Data
US 2009/0224746 A1 Sep. 10, 2009

(30) Foreign Application Priority Data
Mar. 10, 2008 (JP) ................. 2008-059617

(51) Int. Cl.
*G01R 1/02* (2006.01)
(52) U.S. Cl. ........................... 324/130; 73/765

(58) Field of Classification Search .............. 324/130, 324/704; 73/765
See application file for complete search history.

(56) References Cited

U.S. PATENT DOCUMENTS

| 4,387,602 | A * | 6/1983 | Lao ............................. 73/861.09 |
| 6,334,352 | B1 * | 1/2002 | Poggio et al. ................ 73/23.31 |
| 6,651,020 | B2 * | 11/2003 | More ............................. 702/99 |

* cited by examiner

*Primary Examiner* — Shawn Riley
(74) *Attorney, Agent, or Firm* — Arent Fox, LLP (57) ABSTRACT

A correcting circuit includes a correction current synthesizer synthesizing a correction current based on an output signal of a sensor, a current adjuster adjusting a determining current which corresponds to a correction amount based on the correction current, and a correction voltage generator generating a correction voltage for correcting a voltage signal based on the determining current, so as to correct an output characteristic of a voltage signal output in correspondence to the output signal of the sensor.

11 Claims, 11 Drawing Sheets

CORRECTING CIRCUIT, CORRECTING METHOD, AND SENSOR APPARATUS

CROSS-REFERENCE TO RELATED APPLICATIONS

This application is based upon and claims the benefit of priority of the prior Japanese Patent Application No. 2008-059617 filed on Mar. 10, 2008, the entire contents of which are incorporated herein by reference.

FIELD

The present application relates to a correcting circuit, a correcting method, and a sensor apparatus.

BACKGROUND

Figure 1:
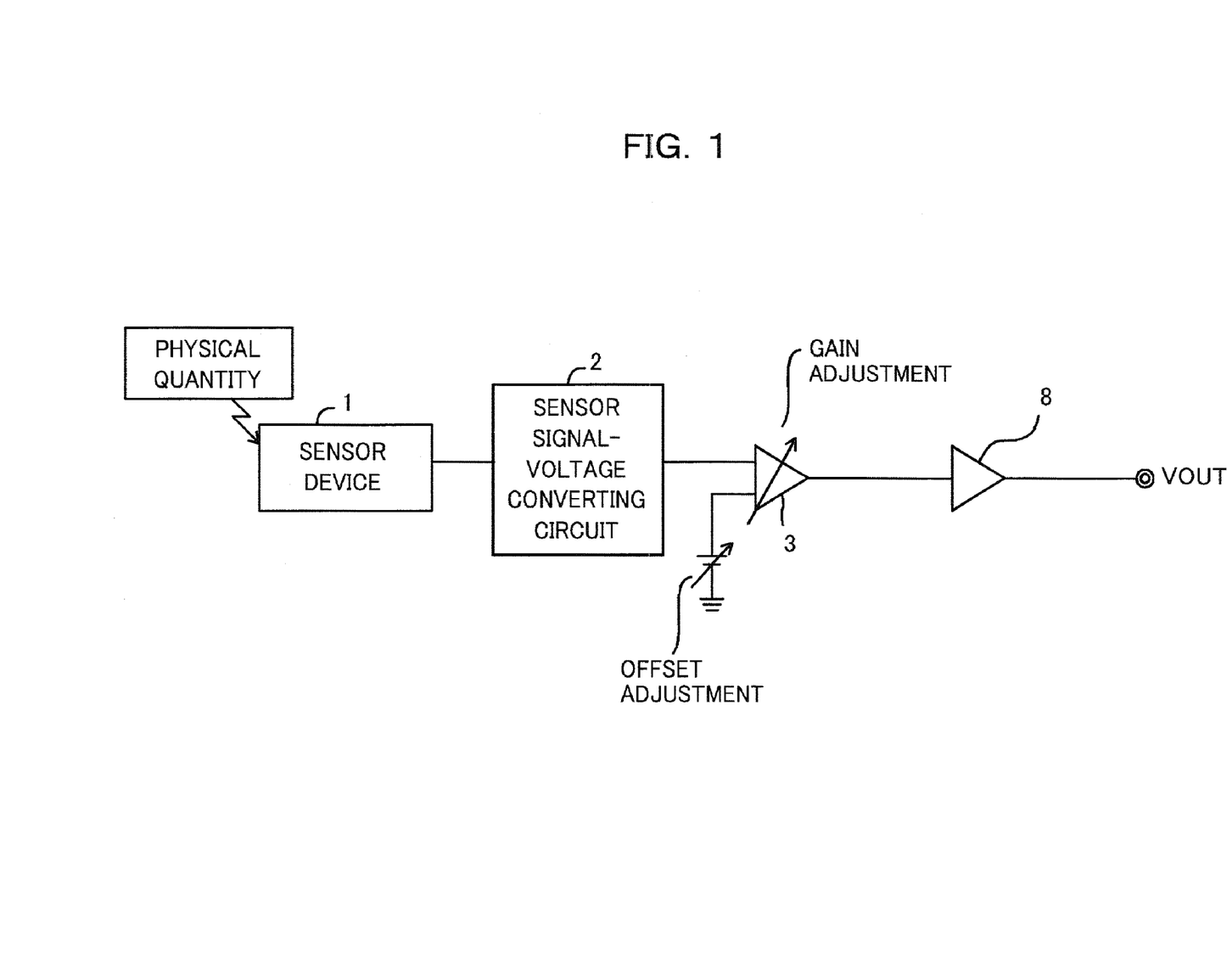
FIG. 1 depicts an example of a typical sensor apparatus.

FIG. 1 depicts a typical sensor apparatus. For example, the resistance value or capacitance value of a sensor device 1 changes depending on a detected physical quantity. A sensor signal-voltage converting circuit 2 converts an output signal which reflects a resistance value or capacitance value of the sensor device 1 to a voltage. An amplifier 3 increases the voltage obtained using the sensor signal-voltage converting circuit 2. The amplifier 3 conventionally has gain adjustment and offset adjustment functions. An output buffer amplifier 8 is supplied with the output voltage of the amplifier 3, and outputs a voltage signal VOUT. With this configuration, the voltage signal VOUT is output in accordance with the physical quantity detected by the sensor device 1.

Figure 2:
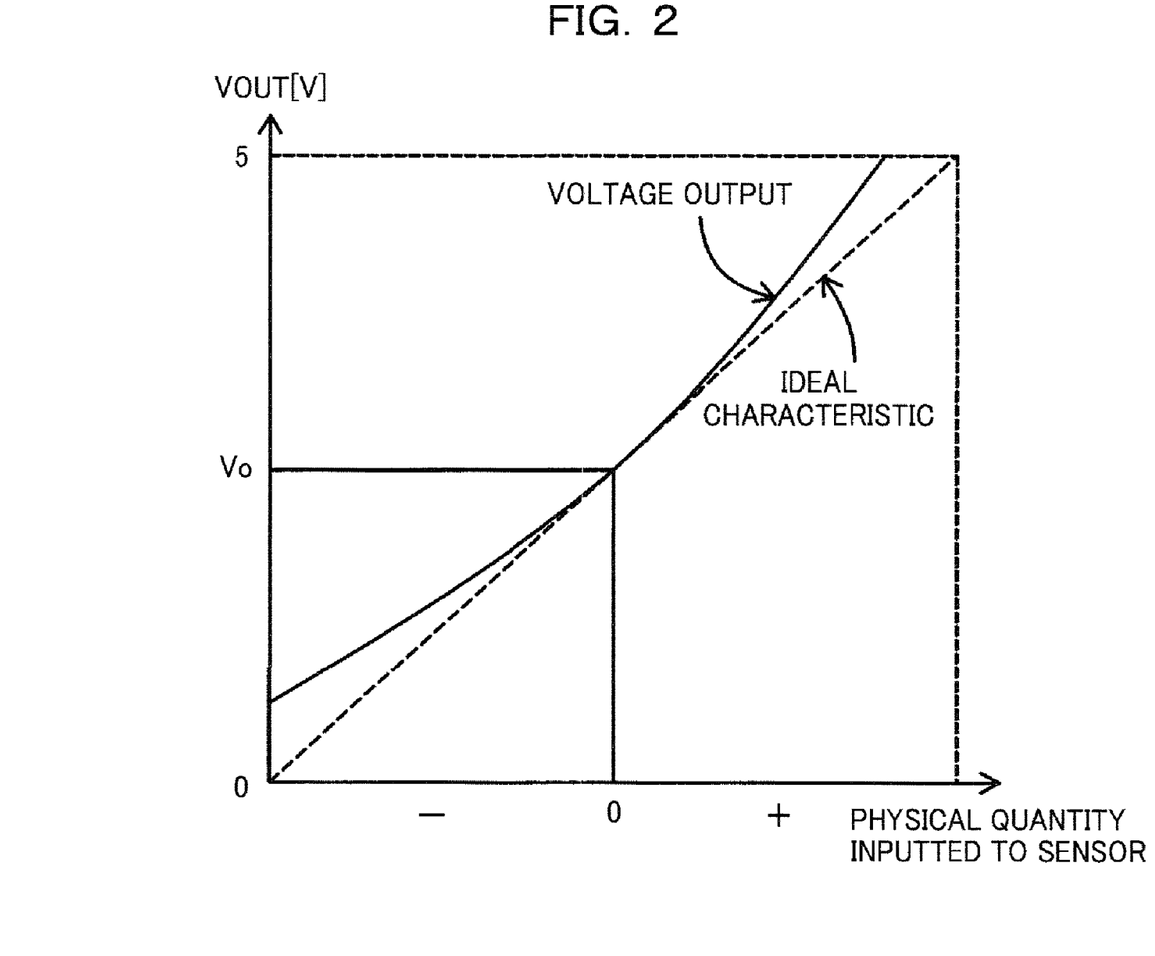
FIG. 2 depicts a typical output characteristic of the sensor apparatus of FIG. 1.

FIG. 2 depicts the typical output characteristics of the sensor apparatus of FIG. 1. The physical quantity, which may be acceleration, pressure, temperature or the like, input to the sensor device 1 is plotted on the horizontal axis. The output voltage signal VOUT [V] is plotted on the vertical axis. The sensor device 1 is adjusted so that when the input is "0", i.e. when the physical quantity is at a neutral or reference level, the voltage signal VOUT is a central voltage V0 of the output range. As the input increases or decreases from "0", the voltage signal VOUT also increases or decreases about the central voltage V0 in the output range of 0 to 5[V].

The typical sensor apparatus depicted in FIG. 1 may require that the output is linear with respect to the input physical quantity. In the typical sensor apparatus depicted in FIG. 1, however, the relationship between the input physical quantity and the output voltage signal VOUT may be non-linear as depicted in FIG. 2 due to the properties of the sensor device 1 itself, scattering of the output, and the like.

In a sensor apparatus for which a linear output like an ideal characteristic may be required, if the voltage output denoted by the voltage signal VOUT strays greatly from the ideal characteristic, the measuring accuracy of the sensor apparatus falls.

SUMMARY

According to an aspect of embodiments, a correcting circuit includes a correction current synthesizer synthesizing a correction current based on an output signal of a sensor, a current adjuster adjusting a determining current which corresponds to a correction amount based on the correction current, and a correction voltage generator generating a correction voltage for correcting a voltage signal based on the determining current, so as to correct an output characteristic of a voltage signal output in correspondence to the output signal of the sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional advantages and novel features of aspects of the present invention will be set forth in part in the description that follows, and in part will become more apparent to those skilled in the art upon examination of the following or upon learning by practice thereof.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF THE EMBODIMENTS

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the aspects in accordance with embodiments of the present inventions have been described in detail, it should be understood that the various changes, substitutions, and alterations could be made hereto without departing from the spirit and scope of the invention.

Figure 3:
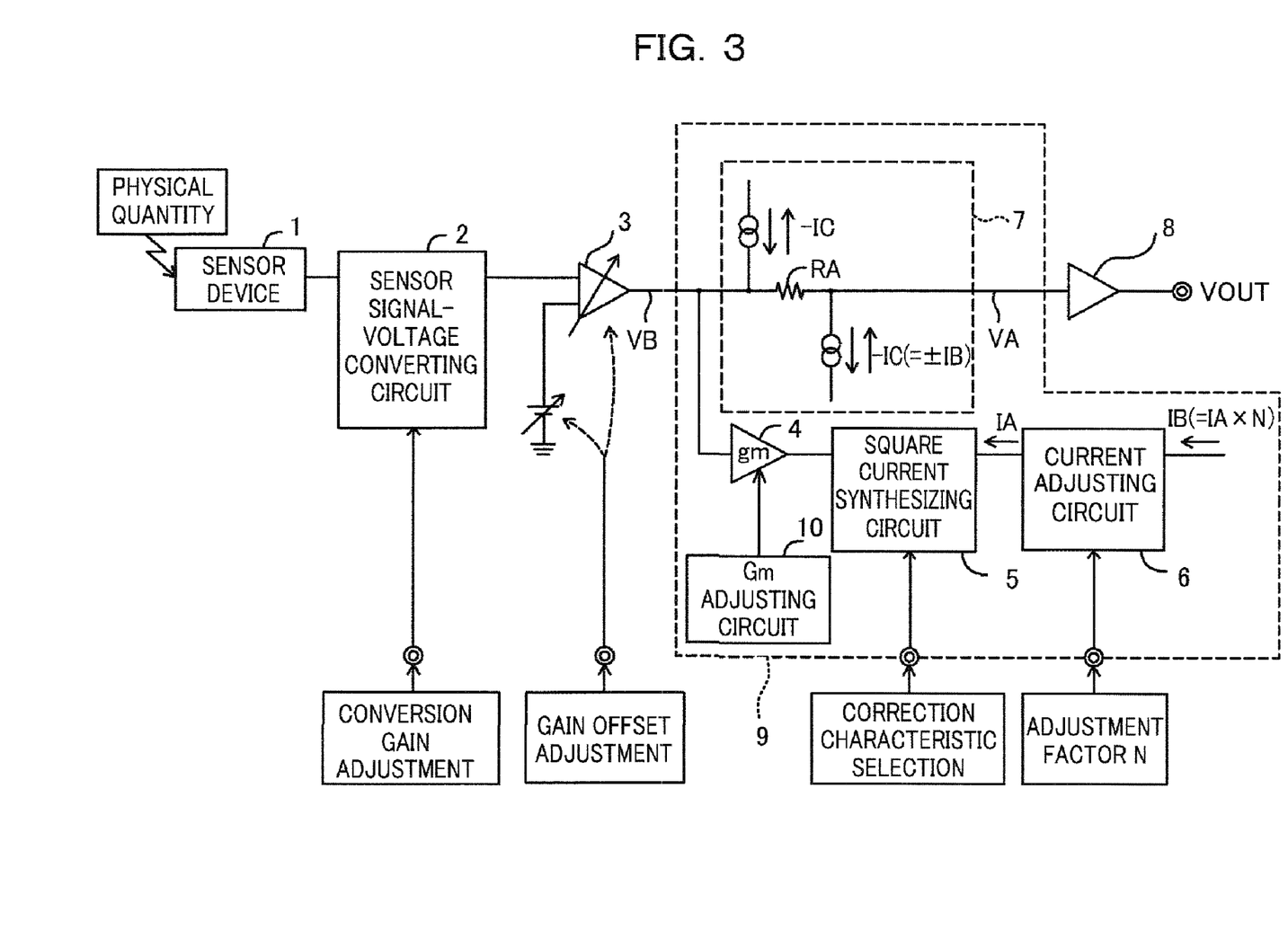
FIG. 3 depicts aspects in accordance with a first embodiment.

FIG. 3 depicts aspects in accordance with a first embodiment. Note that the similar symbols are used for components which correspond to the components in the above-described FIG. 1. In the first embodiment depicted in FIG. 3, a linear correcting circuit 9 is provided between an amplifier 3 and an output buffer amplifier 8.

The linear correcting circuit 9 includes a voltage-current converting amplifier gm 4, a gm adjusting circuit 10, a square current synthesizing circuit 5, a current adjusting circuit 6, and a correction voltage generator 7. An output signal of a sensor device 1 is converted to a voltage by a sensor signal-voltage converting circuit 2. A voltage VB resulting from voltage amplification by an amplifier 3 is input to the gm 4.

The gm 4 is adjusted by the gm adjusting circuit 10, and the input voltage VB is converted to a current which is output to the square current synthesizing circuit 5. The square current synthesizing circuit 5 synthesizes a correction current IA based on the output current from the gm 4, and outputs to the current adjusting circuit 6. In the current adjusting circuit 6, the correction current IA is multiplied by a factor of N to obtain a correction amount determining current IB. The correction voltage generator 7 includes a constant current source which supplies a current IC, a constant current source which supplies a current of -IC flowing in the opposite direction to the current IC and a resistor RA, and generates a correction voltage. The current IC is a current which is equal in magnitude to the correction amount determining current IB and which may be switched in direction. An output buffer amplifier 8 is supplied with the voltage VA, which results from the correction of the voltage VB by the correction voltage, and outputs a voltage signal VOUT.

The conversion gain of the sensor signal-voltage converting circuit 2 is adjusted using an external input. The gain and offset of the amplifier 3 are adjusted using an external input. The correction characteristics of the square current synthesizing circuit 5 are selected using an external input. Moreover, the current adjusting circuit 6 is supplied with the adjustment factor N from an external input.

According to aspects in accordance with the first embodiment depicted in FIG. 3, gm 4, which is a voltage-current converting amplifier, produces a current which is proportional to the potential difference between the voltage VB and a reference voltage. The correction current IA is synthesized by the square current synthesizing circuit 5 and the correction amount determining current IB is adjusted by the current adjusting circuit 6. A correction voltage IB*RA generated by passing a current equal in magnitude to the correction amount determining current IB through the resistor RA corrects the output voltage VB of the amplifier 3 to the input voltage VA of the output buffer amplifier 8.

According to aspects in accordance with the first embodiment depicted in FIG. 3, the correction current IA, which is synthesized based on the output signal of the sensor device 1, is adjusted to produce the correction amount determining current IB, and consequently, the correction voltage IB*RA is generated. The characteristic of the correction voltage is selected using an input from an external portion. Correction is performed to make output characteristics of the voltage signal VOUT substantially linear and improve the measurement accuracy.

According to aspects of the first embodiment depicted in FIG. 3, the current IC and the current −IC, which flows in the opposite direction to the IC, are caused to flow so that a current equal in magnitude to the correction amount determining current IB flows only in the resistor RA. As a result, fluctuations in the input voltage VB are suppressed.

Figure 4:
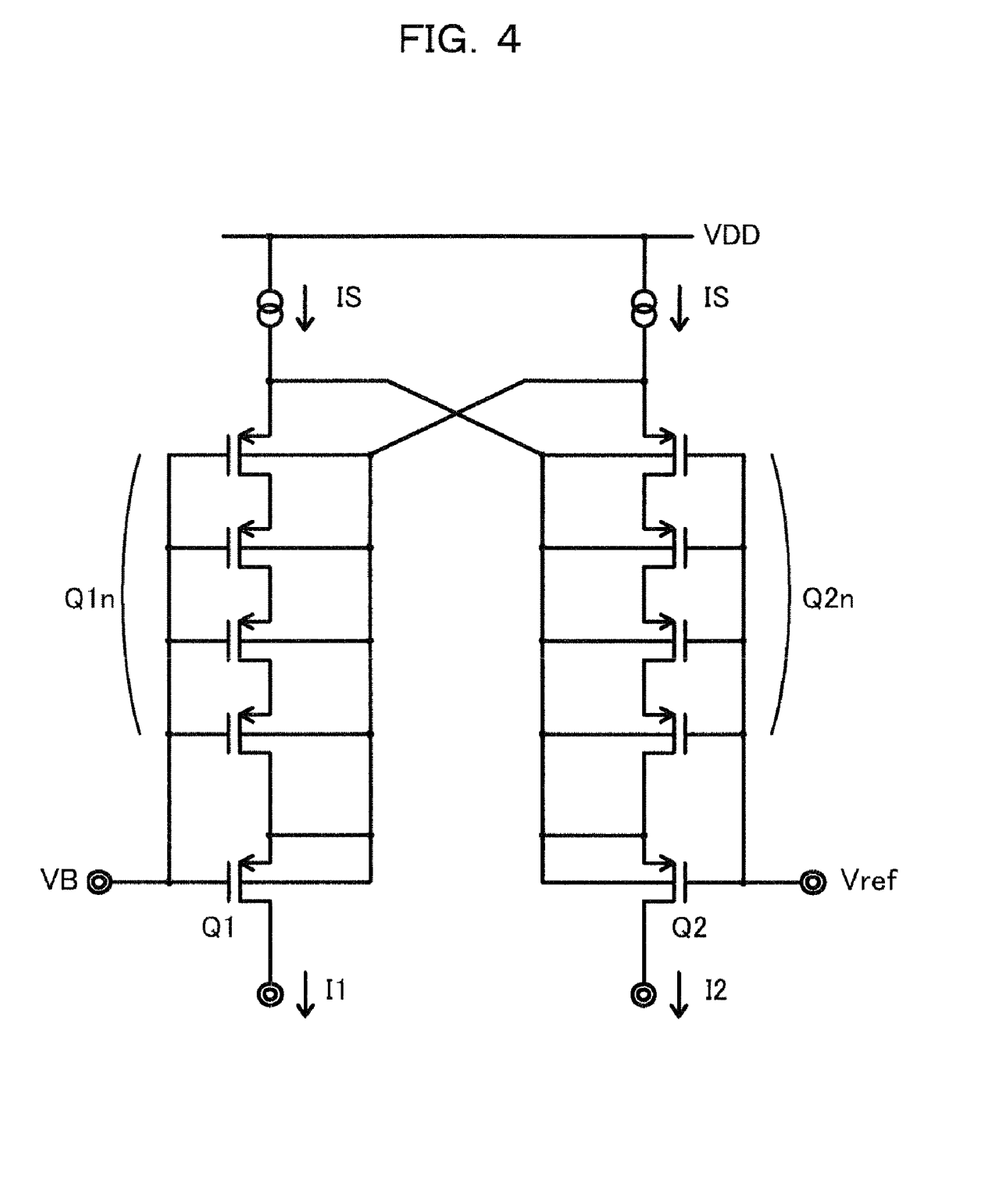
FIG. 4 depicts aspects of an example of gm 4 which is a voltage-current converting amplifier in FIG. 3.

FIG. 4 depicts an example of the voltage-current converting amplifier gm 4 in FIG. 3. The transistors Q1 and Q2, for instance, are differential input transistors, which include a P-channel MOS transistor. A differential input voltage, which is the difference between the voltage VB and the reference voltage Vref, is input to the transistor Q1 and the transistor Q2. The transistor groups Q1$n$ and Q2$n$ each include a plurality of P-channel MOS transistors coupled in series. The sources of the transistors Q1 and Q2 are each coupled to a different one of two constant current sources, each which each supplies a current IS. Each source of transistors Q1 and Q2 is also coupled to other one of the current sources via the transistor groups Q1$n$ and Q2$n$. The transistor groups Q1$n$ and Q2$n$ are equivalent to resistors coupled to the sources of transistors Q1 and Q2, respectively. The back gate of the transistor Q1 and the back gates of each of the transistors of the transistor group Q1$n$ are coupled to the source of the transistor Q1. The back gate of the transistor Q2 and the back gates of each of the transistors of the transistor group Q2 are coupled to the source of the transistor Q2.

As depicted in FIG. 4, the gm 4 which includes the above-described differential pair outputs differential output currents I1 and I2 which vary in proportion to a potential difference between the voltage VB and the reference voltage Vref. As consequence of the transistors Q1 and Q2 and the transistors of the transistor groups Q1$n$ and Q2$n$ being similar size, the gate modulation is identical, and the pair properties of the layout are improved. Even without using a high-value resistor, the input range of the voltage-current converting amplifier is widened and the linearity improves. By coupling the back-gates in the manner described above, rises in the threshold voltage due to the back-gate dependency of MOS transistors is suppressed. Hence the source voltage VDD may be lowered and the current consumption of the circuit may be lowered.

Figure 5:
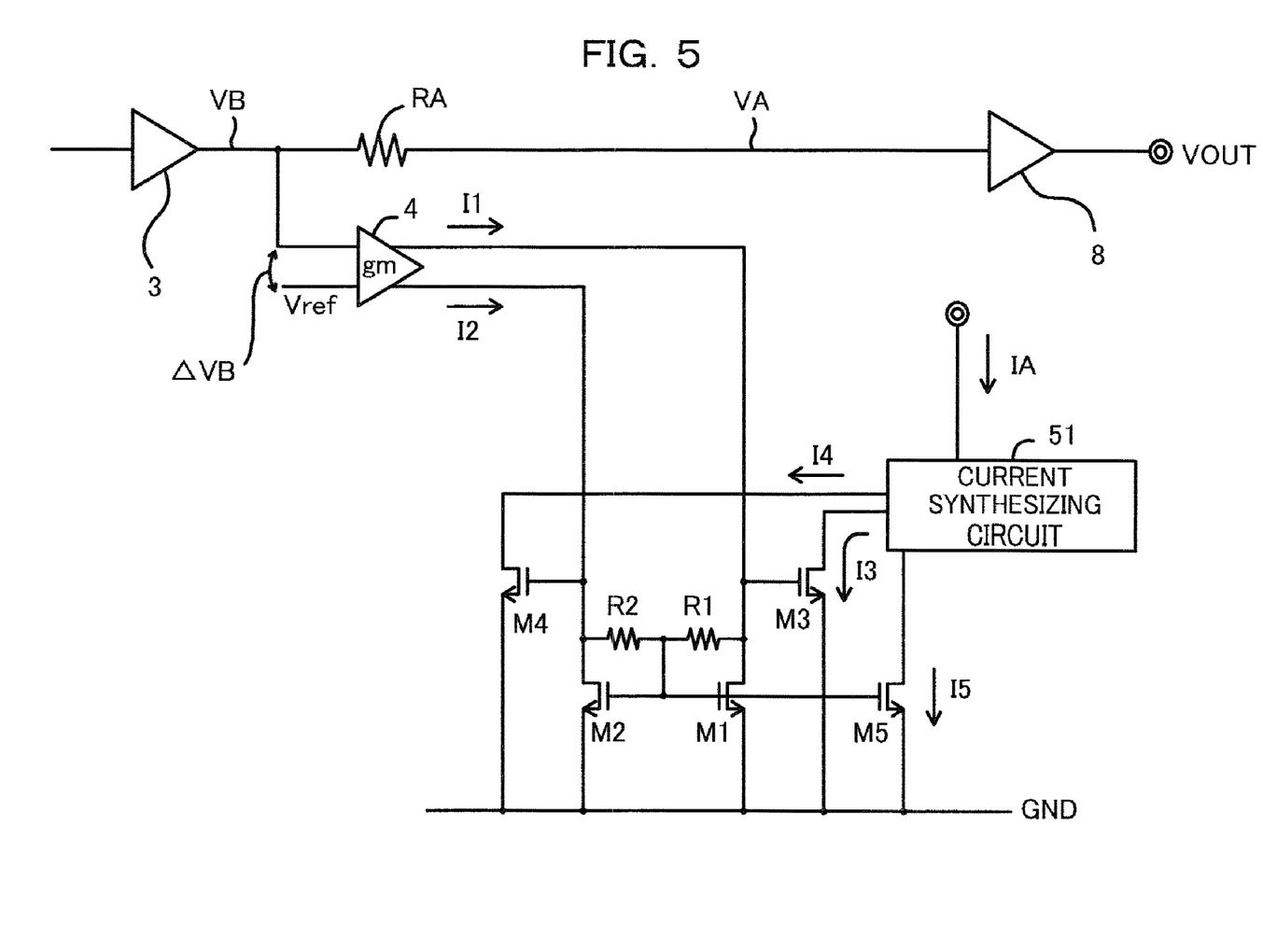
FIG. 5 depicts aspects of an example of a square current synthesizing circuit 5 in FIG. 3.

FIG. 5 depicts an example of the square current synthesizing circuit 5 in FIG. 3. In FIG. 5, components which correspond to the components in the above-described FIGS. 3 and 4 are denoted using the similar symbols.

As depicted in FIG. 5 and described with reference to FIG. 4, the gm 4 is supplied with a differential input voltage ΔVB, which is the potential difference between the voltage VB and the reference voltage Vref, and outputs the differential output currents I1 and I2. Resistors R1 and R2 of equal resistance value are coupled in series between differential output lines. The gate of a transistor M1, which is an N-channel MOS transistor, is coupled to a point between the resistors R1 and R2 while the drain of the transistor is coupled to the differential output line which carries the current I1. The gate of a transistor M2, which is an N-channel MOS transistor is coupled to a point between the resistors R1 and R2 and the drain of the transistor is coupled to the differential output line which carries the current I2. The gate of a transistor M3, which is an N-channel MOS transistor, is coupled to the drain of the transistor M1, and a current I3 flows in the transistor M3. The gate of a transistor M4, which is an N-channel MOS transistor, is coupled to the drain of the transistor M2, and a current I4 flows in the transistor M4. The gate of the transistor M5, which is an N-channel MOS transistor, is commonly coupled to the gates of the transistors M1 and M2, the source of the transistor M5 is commonly coupled to the sources of the transistors M1 and M2, and a current I5 flows in the transistor M5. The current synthesizing circuit 51 synthesizes the correction current IA from the currents I3, I4 and I5.

The following describes operations of the square current synthesizing circuit 5 in FIG. 5. The resistors R1 and R2 of equal resistance value work to keep the gate voltages of transistors M1, M2 and M5 constant regardless of variation in the differential output currents I1 and I2. As a result, the currents flowing in transistors M1, M2 and M5 are always constant. A variation in the differential output currents I1 and I2 causes a current to flow in the resistors R1 and R2. As a consequence, when the voltage VB>reference voltage Vref, the current I3 is described by a quadratic function of the differential input voltage ΔVB and the current I4 is approximately equal to the current I5. When the voltage VB<the reference voltage Vref, the current I3 is approximately equal to the current I5, and the current I4 is described by a quadratic function of the differential input voltage ΔVB. When the voltage VB=reference voltage Vref, i.e. when differential input voltage ΔVB 32 0, for example, the differential output currents I1 and I2 are equal, no current flows in the resistors R1 and R2, and the currents I3 and I4 are equal to the current I5.

In the square current synthesizing circuit 5 in FIG. 5, good circuit characteristics may be obtained by making the transistors M1 and M2 similar in size to each other and the transistors M3, M4 and M5 similar in size to one another. Note, for instance, that transistors M1 and M2 carry the differential output currents I1 and I2 of gm 4. The transistors M3, M4 and M5 may therefore have a smaller size than the transistors M1 and M2. Where smaller size transistors are used, the overall current consumption of the circuit is reduced.

Figure 6:
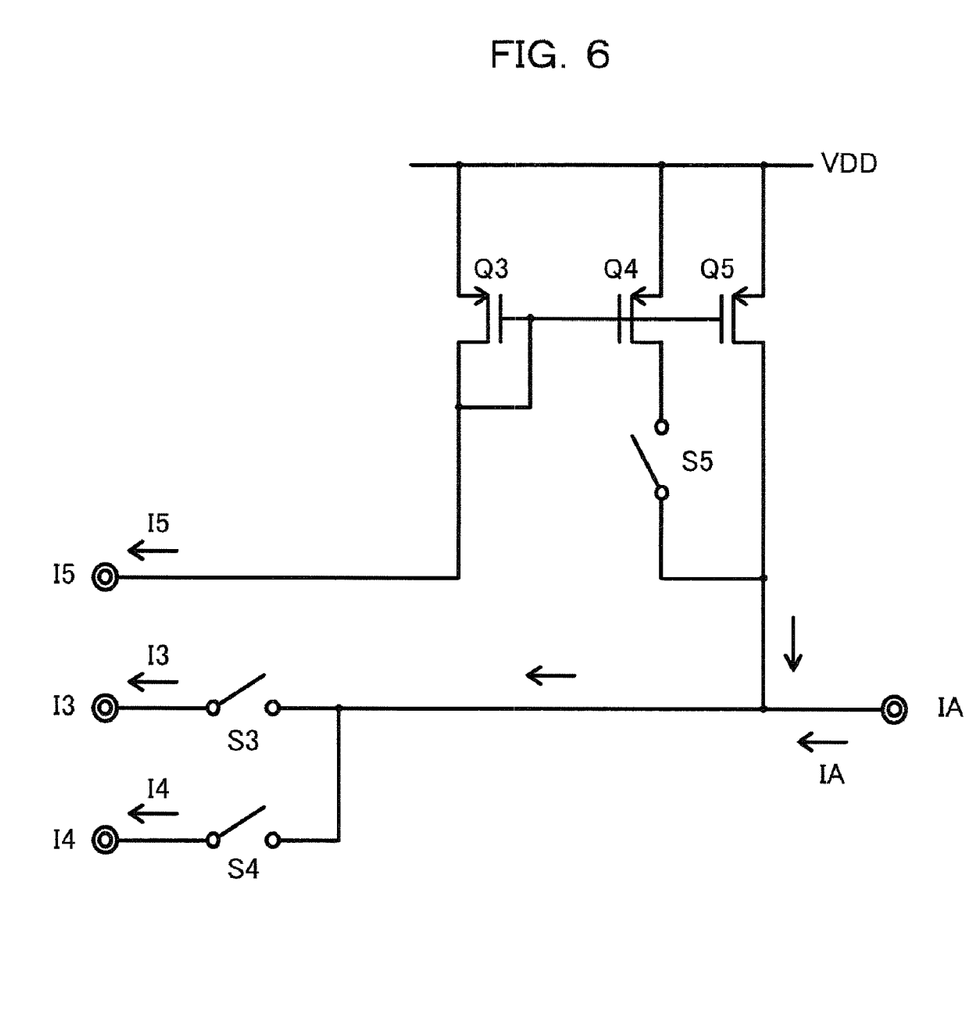
FIG. 6 depicts aspects of an example of a current synthesizing circuit 51 in FIG. 5.

FIG. 6 depicts an example of the current synthesizing circuit in FIG. 5. As depicted in FIG. 6, the currents I3, I4 and I5 are caused to flow based on the differential output currents I1 and I2 of the gm 4 described with reference to FIG. 5. The transistors Q3, Q4 and Q5, which include a P-channel MOS transistor, form a current mirror circuit. An input portion of the current mirror circuit is coupled to the transistor M5 depicted in FIG. 5. Output portions are coupled to the transistors M3 and M4 of FIG. 3 via switches S3 and S4 respectively. Further, a switch S5 is inserted into the output line of the transistor Q4.

In the current synthesizing circuit 51 of FIG. 6, the characteristics of the correction current IA synthesized by the current synthesizing circuit change as the switches S3, S4 and S5 are switched on and off. For instance, when the switch S3 is on, the correction current IA=I3−I5. When the switches S3, S4 and S5 are all on, the correction current IA=I3+I4−2*I5. It may be therefore possible to synthesize correction current IA with variable characteristics based on the differential output currents I1 and I2 of the voltage-current converting amplifier gm 4.

Figure 7:
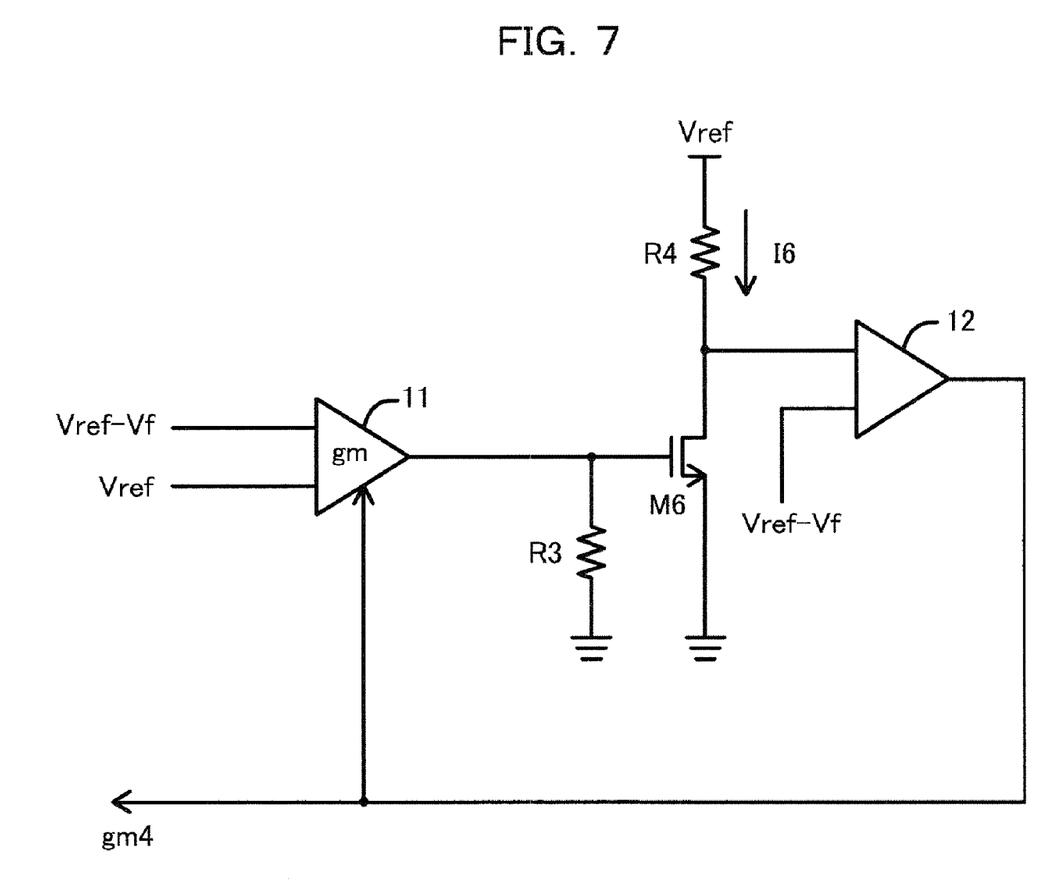
FIG. 7 depicts aspects of an example of a gm adjusting circuit 10 in FIG. 3.

FIG. 7 depicts an example of the gm adjusting circuit 10 in FIG. 3. In FIG. 3, for example, the voltage Vf is a value given by finding the difference between the central voltage V0 and a full-scale value of the voltage signal VOUT within the set output range (i.e. a maximum amplitude with respect to the central voltage V0), and dividing the difference by the gain of the output buffer amplifier 8. For instance, if the set output range of the voltage signal VOUT is 0 to 5[V], the central voltage V0 is about 2.5[V], and the full-scale values of the voltage signal VOUT are about 0[V] and about 5[V]. Hence, the maximum amplitude from the central voltage V0 is about 2.5[V] and, when the output buffer amplifier 8 has a gain of about 5 times, the voltage Vf is about 0.5[V].

As depicted in FIG. 7, gm 11, which is a voltage-current converting amplifier, is supplied with a differential input voltage between the reference voltage Vref−voltage Vf and the reference voltage Vref. The voltage generated by the output current of gm 11 flowing in a resistor R3 is input to the gate of a transistor M6, which is an N-channel MOS transistor. The drain of the transistor M6 is coupled to the reference voltage Vref via a resistor R4. The buffer amplifier 12 is supplied with differential input voltages of "Vref−I6*R4", which is the reference voltage Vref minus the voltage I6*R4 generated by the drain current I6 of the transistor M6 flowing through the resistor R4, and "reference voltage Vref−voltage Vf". The output of the buffer amplifier 12 is fed back to gm 11 and gm 4.

In a comparison of the gm adjusting circuit 10 in FIG. 7 and the square current synthesizing circuit 5 in FIG. 5, gm 11 corresponds to gm 4, the resistor R3 to the resistors R1 and R2, the transistor M6 to the transistors M3 and M4, the resistor R4 to the resistor RA, and the current I6 to the correction current IA. In other words, the gm adjusting circuit 10 may be said to be a so-called dummy circuit of the square current synthesizing circuit 5.

As further depicted in FIG. 7, for the differential input voltages, the buffer amplifier 12 controls the output so that Vref−I6*R4=Vref−Vf, which is the similar as saying that I6*R4=Vf. I6*R4 is IA*RA, a quantity which corresponds the correction voltage prior to correction amount adjustment. Hence, by adjusting the ratio between corresponding components such as RA and R4 of the gm adjusting circuit 10 and the square current synthesizing circuit 5, respectively, the maximum value of the correction amount is adjusted. Through use of this type of feedback, it may be possible to suppress variation in the currents I3 and I4 which occurs due to the effects of temperature and process conditions.

Figure 8:
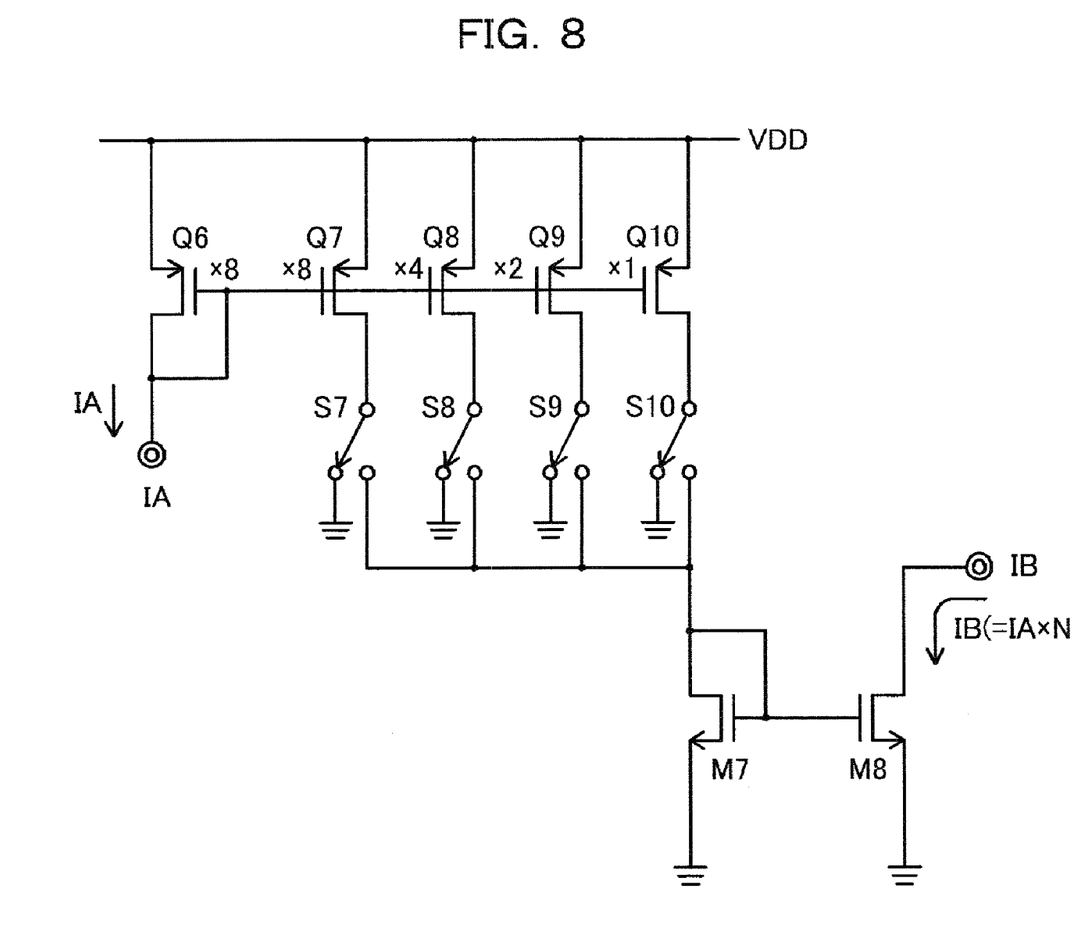
FIG. 8 depicts aspects of an example of a current adjusting circuit 6 in FIG. 3.

FIG. 8 depicts an example of the current adjusting circuit 6 in FIG. 3. The transistors Q6 to Q10 which include P-channel MOS transistors and the switches S7 to S10 form a weighted current mirror D/A converter. The multiplication factors are current supplying capabilities determined by the aspect ratios W/L of the transistors. The weighted current mirror D/A converter is coupled to the current synthesizing circuit 51 which is the output portion of the square current synthesizing circuit 5 of FIG. 5. The current mirror circuit, which made up of the transistors M7 and M8 that are N-channel MOS transistors, outputs the correction amount determining current IB which results from adjusting the correction current IA by a factor of N using the weighted current mirror D/A converter.

According to the current adjusting circuit 6 in FIG. 8, the correction amount determining current IB is adjusted by switching the couplings of switches S7 to S10. For instance, in the case of a 4-bit weighted current mirror D/A converter as depicted in FIG. 6, the correction current IA may be adjusted to produce the correction amount determining current IB by a factor of 1/8 to 15/8, for example.

Figure 9:
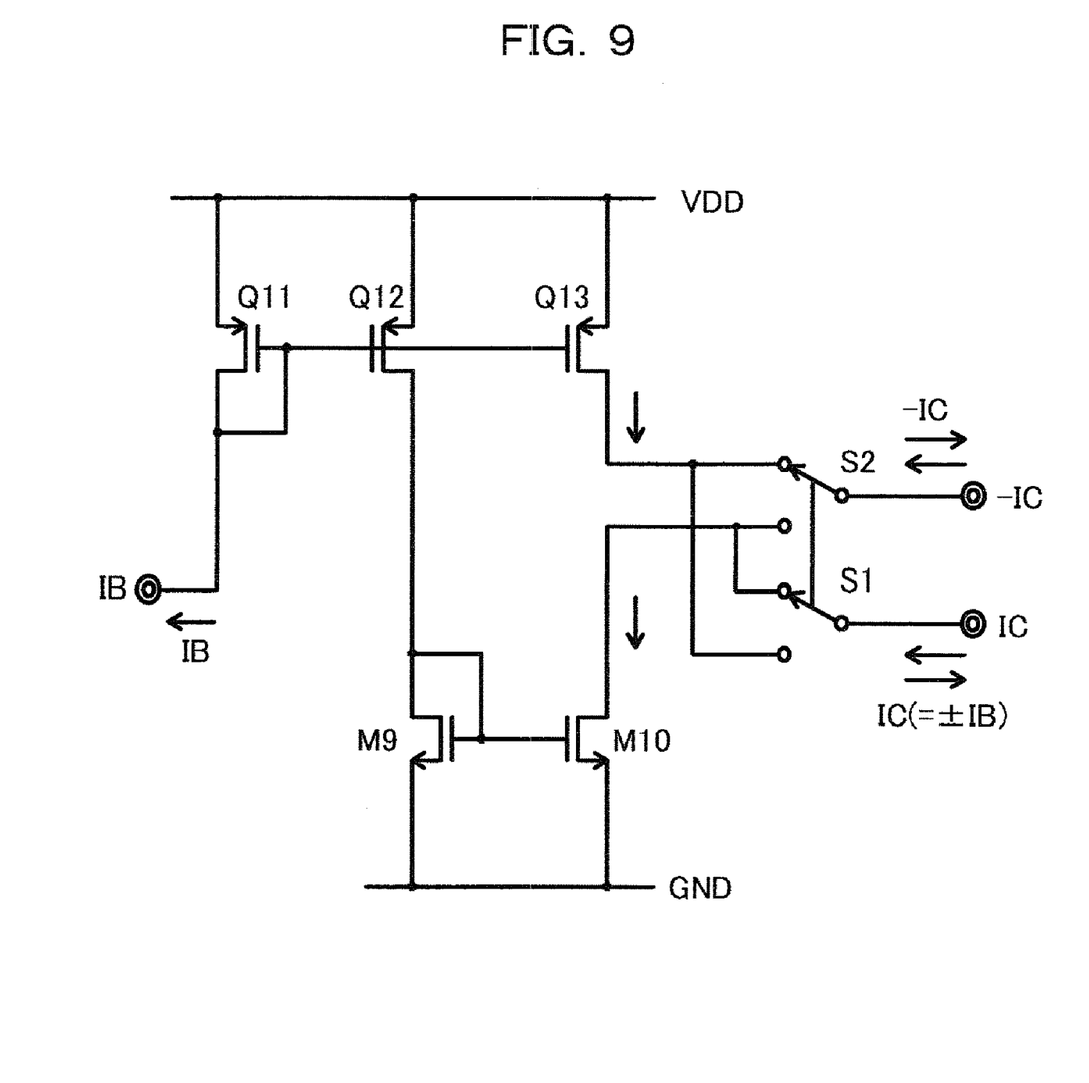
FIG. 9 depicts aspects of an example of a current reversing circuit of the correction voltage generator 7 in FIG. 3.

The following describes, with reference to FIG. 9, an example of the two constant current sources which cause the currents IC and −IC to flow in the correction voltage generator 7 in FIG. 3.

As depicted in FIG. 9, the constant current source includes, for instance, a current reversing circuit. The transistors Q11 to Q13 which include P-channel MOS transistors and the transistors M9 and M10 which are N-channel MOS transistors form current mirror circuits respectively. An input portion of the current mirror circuit formed by the transistors Q11 to Q13 is coupled to the transistor M8 in FIG. 8. The output portion of the current mirror circuit made up of the transistors Q11 to Q13 is either directly coupled to the linked switches S1 and S2 or coupled via the current mirror circuit made up of the transistors M9 and M10 to the linked switches S1 and S2.

As further depicted in FIG. 9, by switching the couplings of switches S1 and S2, it may be possible to obtain currents IC and −IC which are equal in magnitude to the correction amount determining current IB and may be switched in direction. When the currents IC and −IC are supplied as described with reference to FIG. 3, a current equal in magnitude to the correction amount determining current IB flows in the resistor RA. As a result, fluctuations in the voltage VB on the input side are suppressed.

Figure 10:
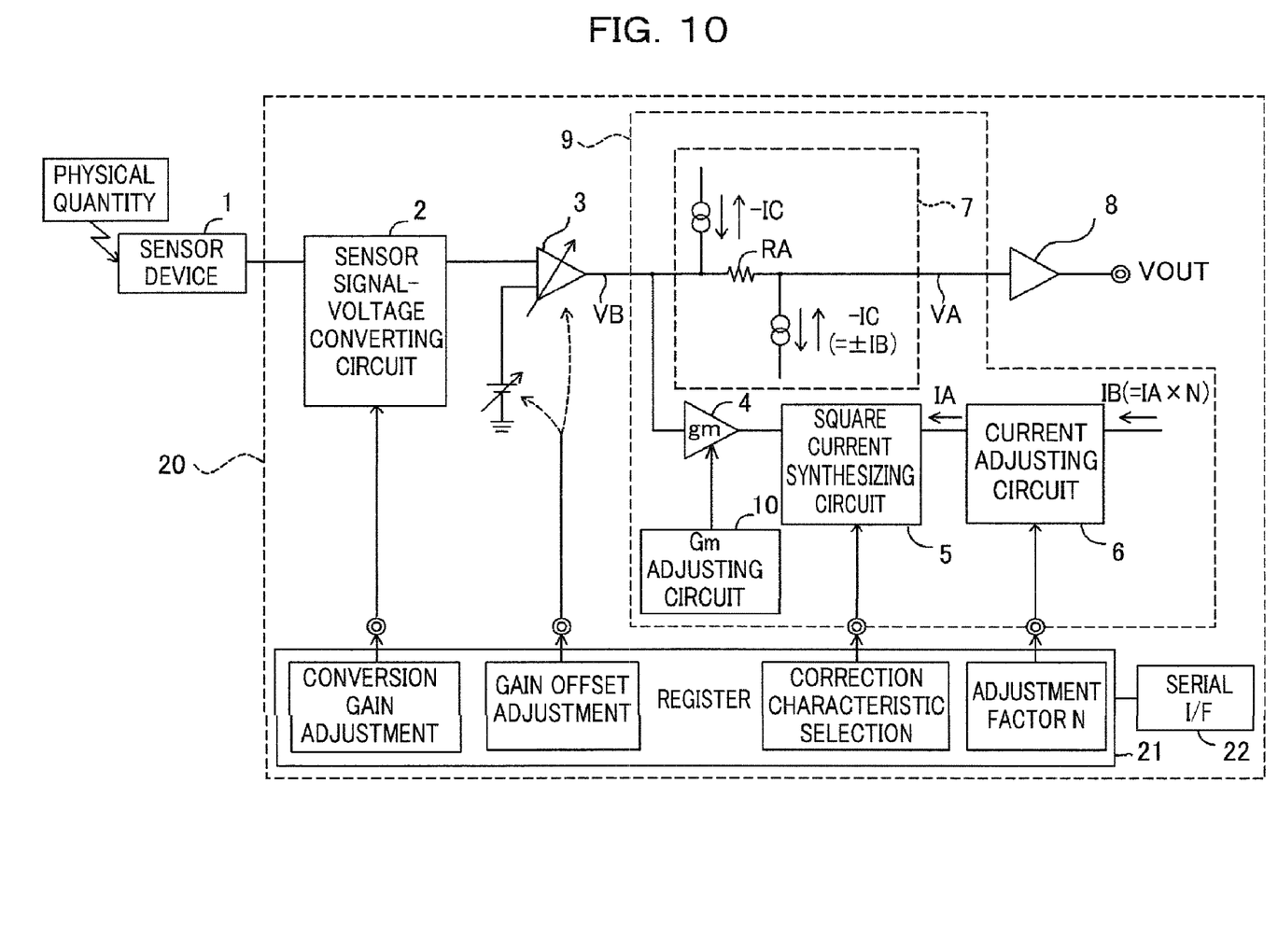
FIG. 10 depicts aspects of a sensor apparatus to which the first embodiment is applied.

FIG. 10 depicts aspects of an example of a sensor apparatus to which the first embodiment in FIG. 3 is applied. Note that in FIG. 10 similar symbols are used for components which correspond to the components in FIG. 3. Descriptions of the components described in connection with FIG. 3 are omitted from the following.

As depicted in FIG. 10, a sensor apparatus 20 includes a register 21 which stores correction information and a serial I/F 22 which passes correction information from an external portion and to register 21.

According to the sensor apparatus in FIG. 10, output characteristics of the voltage signal VOUT are corrected by supplying bit information as correction information. First, offset adjustment (zero-point adjustment) is performed. In the offset adjustment, the input to the sensor device 1 is set to "0", for example. For example, the output voltage signal VOUT of the sensor apparatus 20 when the physical quantity is at the reference, or so-called neutral level, is adjusted as the central voltage V0 of the output range. The adjustment, for example, may be executed by using an offset adjusting function of the amplifier 3.

Next, gain adjustment (sensitivity adjustment) is performed. In the gain adjustment, the gain is adjusted so that the output voltage signal VOUT of the sensor apparatus 20 when a physical quantity has been applied to the sensor device 1 is a voltage corresponding to the physical quantity. The adjustment, for example, may be executed by using a gain adjusting function of the amplifier 3.

In the gain adjustment, the setting of physical quantity applied to the sensor device 1 and the voltage value which corresponds to the physical quantity may be changed according to the characteristics of the sensor device 1, which is the target of the adjustment. For instance, the gain is adjusted so that when the input to the sensor device 1 goes from a neutral physical quantity of "0" to "+1", for example, the output voltage signal VOUT of the sensor apparatus 20 becomes central voltage V0+1[V]. For instance, the gain is adjusted so that when the input to the sensor device 1 goes from a neutral physical quantity of "0" to "−1", for example, the output voltage signal VOUT of the sensor apparatus 20 becomes the central voltage V0−1[V].

Selection of correction characteristics and an adjustment of a correction amount which follow the offset adjustment and gain adjustment are described below with reference to FIGS. 11A to 11H.

FIGS. 11A to 11H depict correction voltage characteristics. The switches S3 to S5 of the current synthesizing circuit 51 in FIG. 6 are switched on and off by 3-bit information being supplied from the external portion as correction characteristic selection information. The provision of the 3-bit information therefore determines the characteristic of the correction current IA. The couplings of the switches S7 to S10 of the current adjusting circuit 6 in FIG. 8 are switched by 4-bit information being provided from the external portion as the adjustment factor N. The provision of the 4-bit information, therefore, adjusts the correction amount determining current IB. Further, the couplings of the switches S1 and S2 of the current reversing circuit in FIG. 9 are switched by 1-bit information being provided from the external portion. As a result, it may be possible to obtain the currents IC and −IC, and the direction of the current that is equal in magnitude to the correction amount determining current IB and that flows in the resistor RA is changed.

The correction voltages characteristics depicted in FIGS. 11A to 11H may be obtained in the manner described above.

Figure 11A:
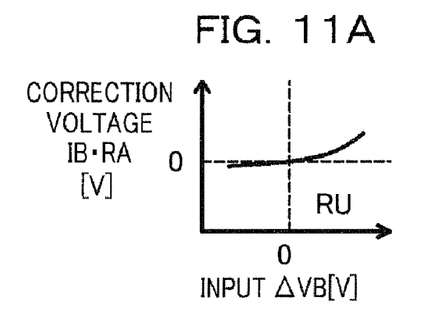
FIGS. 11A-11H depict correction voltage characteristics.
Figure 11B:
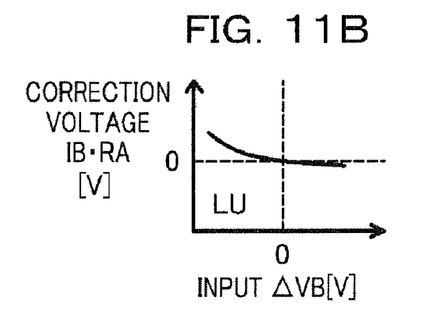
Figure 11C:
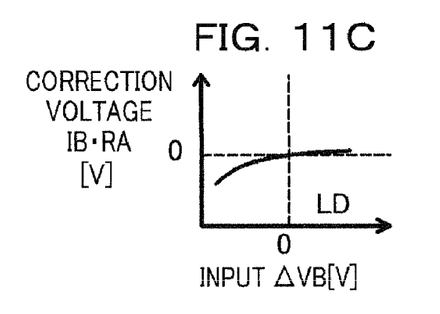
Figure 11D:
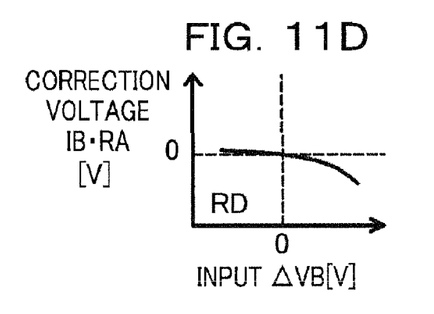
Figure 11E:
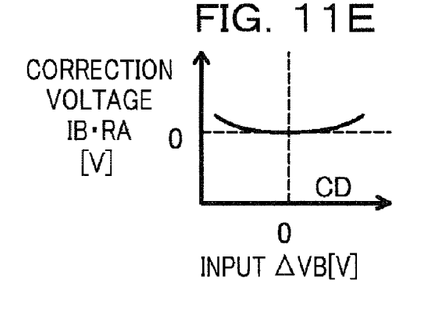
Figure 11F:
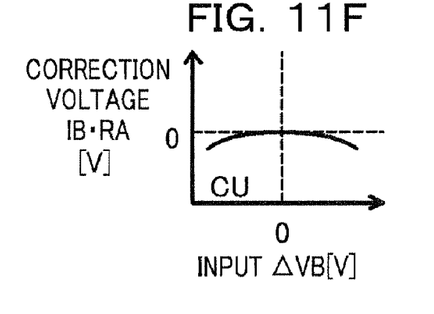
Figure 11G:
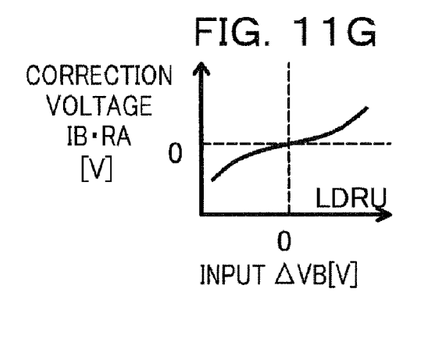
Figure 11H:
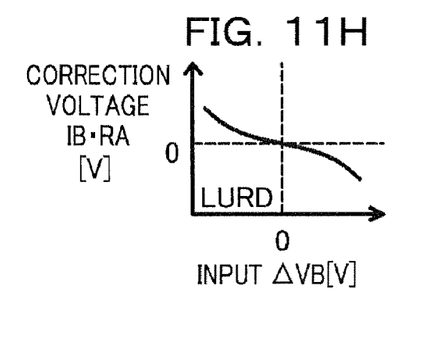

For instance, by providing bit information which switches on the switch S3 in FIG. 6 and couples the switches Si and S2 in FIG. 9 so that IC=+IB, the characteristic RD depicted in FIG. 11D is obtained. By providing bit information which switches on the switch S3 in FIG. 6 and couples the switches S1 and S2 in FIG. 9 so that IC=−IB, polarity is reversed and the characteristic RU depicted in FIG. 11A is obtained. The characteristics LU and LD depicted in FIG. 11B and FIG. 11C, respectively, are obtained by combining bit information to switch on the switch S4 in FIG. 6 and bit information for the switches S1 and S2 in FIG. 9. The characteristics CD, CU, LDUR and LURD depicted in FIGS. 11E to 11H, respectively, are obtained by combining bit information to switch on the switches S3 to S5 in FIG. 6 and bit information for the switches S1 and S2 in FIG. 9. The correction amount may also be adjusted using bit information for the switches S7 to S10 in FIG. 8.

Since, as described above, the correction current may be described as a quadratic function of the differential input voltage $\Delta VB$, the curved portions of the correction voltage characteristics depicted in FIGS. 11A-H are quadratic curves with $\Delta VB$ as the variable. Hence, in the selection of the correction characteristics, a correction voltage including more favorable characteristics may be selected by approximating, as quadratic functions, the output characteristics of the output voltage signal VOUT of the sensor apparatus 20 prior to correction. For example, a correction voltage including the opposite concave/convex shape to the output voltage signal VOUT of the sensor apparatus 20 prior to correction may be selected. Adding the correction voltage selected in this way using the linear correcting circuit 9 depicted in FIG. 3 and FIG. 10 allows substantially linear output characteristics to be obtained. By supplying the bit information as correcting information to select the correction characteristic, the correction amount is adjusted and the output characteristic of the voltage signal VOUT is corrected.

The sensor device 1 is an example of the sensor device of the claims. The sensor signal-voltage converting circuit 2 is an example of the sensor signal-voltage converter. The amplifier 3 is an example of the voltage amplifier. The gm 4 is an example of the voltage-current converter. The square current synthesizing circuit 5 is an example of the correction current synthesizer. The current adjusting circuit 6 is an example of the current adjuster. The correction voltage generator 7 is an example of the correction voltage generator. The output buffer amplifier 8 is an example of the output buffer amplifier. The linear correcting circuit 9 is an example of the linear correcting circuit. The gm adjusting circuit 10 is an example of the dummy circuit corresponding to the correction current synthesizer. The sensor apparatus 20 is an example of the sensor apparatus. The register 21 is an example of the memory which stores the correction information. The current synthesizing circuit 51 is an example of the current synthesizer. The voltage signal VOUT is example of the voltage signal. The voltage VA is an example of the corrected voltage. The voltage VB is an example of the voltage obtained by voltage conversion of the output signal of the sensor device. The current IA is an example of the correction current. The current IB is an example of the correction amount determining current. The voltage IB*RA is an example of the correction voltage. The voltage Vref is an example of the reference voltage. The voltage V0 is an example of the central voltage of the output range. The differential input voltage $\Delta VB$ is an example of the differential input voltage between the voltage obtained by voltage conversion of the output signal of the sensor device and the reference voltage. The currents I1, I2, I3, I4, I5 and I6 are examples of the first, second, third, fourth, fifth, and sixth currents respectively. The resistors R1, R2, R3 and R4 are examples of the first, second, third and fourth resistors respectively. The transistors M1, M2, M3, M4, M5 and M6 are examples of the first, second, third, fourth, fifth, and sixth transistors respectively. The transistors Q3, Q4 and Q5 are examples of the current mirror circuit. The switches S3, S4 and S5 are examples of the switches. The transistors Q6 to Q10 and the switches S7 to S10 are examples of the weighted current mirror D/A converter. The current reversing circuit depicted in FIG. 7 is an example of the current reversing circuit. The transistors Q11 to Q13 are an example of the current mirror circuit. The switches S1 and S2 are examples of the switches which switch the direction of the correction amount determining current. The resistor RA is an example of the current-voltage converter.

According to aspects of the above-described embodiment, the measurement accuracy of the sensor apparatus which voltage converts the output signal of the sensor device and outputs the resulting voltage signal is improved by performing correction to linearize the output characteristic of the output signal.

For the linear correction, an alternative method may be used in which the voltage signal is converted by an A/D converter and the correction amount is calculated by a microcomputer or the like. In this case, however, the final output voltage signal is corrected at the subsequent stage of the output buffer amplifier, and consequently an input/output permissible power range may be restricted. By performing the processing in an analog manner at the previous stage of the output buffer amplifier like in the present embodiment, the input/output power permissible range becomes wider, and a correction is realized using a relatively small-scale circuit.

In aspects of the above-described embodiment, selection of correction characteristics and adjustment of correction amount are performed by bit information being provided as correction information, and the output characteristics of the voltage signal VOUT are corrected. A correction voltage including more favorable characteristics may be selected by approximating the output characteristic of the output voltage signal VOUT of the sensor apparatus prior to correction as a quadratic function. In comparison to an approximation using a plurality of linear functions, the approximation using the quadratic function offers smoother variation and better noise-resistance. Further, the approximation using the quadratic function is simpler than an approximation using cubic or higher-order functions.

The above-described embodiment may undergo various improvements and modifications without departing from the spirit of the present application.

For example, the directions of the currents such as the correction current IA are not limited to the directions depicted in the drawings. The currents may flow in opposite directions to those depicted.

In the example of the gm adjusting circuit 10 depicted in FIG. 7, the maximum value of the correction amount was described as being adjusted by adjusting the ratio of corresponding elements in the gm adjusting circuit 10 and the square current synthesizing circuit 5, such as the ratio RA/R4. However, this arrangement is not limiting. For example, the "reference voltage Vref–voltage Vf" may be varied.

In the example of the current adjusting circuit 6 depicted in FIG. 8, the transistors Q6 to Q10 of the weighted current mirror D/A converter were described as including a current supplying capability determined by the corresponding aspect ratios W/L. However, this arrangement is not limiting. For instance, unit transistors of the similar size may be used in place of the transistors Q6 to Q10 so that the current supplying capability may vary according the number of transistors.

The sensor apparatus 20 depicted in FIG. 10 may be integrated together with the sensor device 1 on a single silicon substrate a similar MS (Micro Electro Mechanical System).

The above-described embodiment may be applied to a sensor apparatus which outputs, based on an output signal of a sensor device which detects a physical quantity such as acceleration, pressure or temperature, a voltage signal proportional to the physical quantity.

According to the above-described embodiment, a linear correcting circuit, a linear correcting method and a sensor apparatus are provided which enable the measurement accuracy of the sensor apparatus which voltage converts the output signal of the sensor device and outputs the resulting voltage signal to be improved by performing a correction to linearize the output characteristic of the voltage signal.

According to the above-described embodiment, a correction voltage is generated by adjusting a correction current synthesized based on the output signal of the sensor device to a current that determines the correction amount. The correction voltage characteristics are selected according to the type and properties of the sensor device.

It is noted that embodiment numbers (first, second or third etc.) do not show priorities of the embodiments. Many variations and modifications will be apparent to those skilled in the art.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

What is claimed is:

1. A correcting circuit comprising:
 a correction current synthesizer synthesizing a correction current based on an output signal of a sensor;
 a current adjuster adjusting a determining current which corresponds to a correction amount based on the correction current; and
 a correction voltage generator generating a correction voltage for correcting a voltage signal based on the determining current, so as to correct an output characteristic of a voltage signal output in correspondence to the output signal of the sensor.

2. The correcting circuit according to claim 1, further comprising:
 a voltage-current converter including a differential pair receiving an input of a differential input voltage between a voltage obtained by voltage conversion of the output signal of the sensor and a reference voltage, and outputting a differential output current of a first current and a second current to the correction current synthesizer,
 wherein the correction current synthesizer comprises:
  a first resistor and a second resistor coupled in series with each other between differential output lines of the differential pair;
  a first transistor comprising a gate coupled to a point between the first resistor and the second resistor and a drain coupled to the differential output line which carries the first current;
  a second transistor comprising a gate coupled to a point between the first resistor and the second resistor and a drain coupled to the differential output line which carries the second current;
  a third transistor comprising a gate coupled to the drain of the first transistor and carrying a third current described by a quadratic function of the differential input voltage;
  a fourth transistor comprising a gate coupled to the drain of the second transistor and carrying a fourth current described by a quadratic function of the differential input voltage;

a fifth transistor comprising a gate commonly coupled to the first and second transistors and a source commonly coupled to the first and second transistors and carrying a fifth current; and a current synthesizer synthesizing the correction current from the third, fourth and fifth currents.

3. The correcting circuit according to claim 2, wherein the current synthesizing circuit comprises a current mirror circuit comprising an input coupled to the fifth transistor, and outputs coupled to the third and the fourth transistors via switches, respectively, wherein a characteristic of the correcting current varies based on a combination of the switches and the current mirror circuit.

4. The correcting circuit according to claim 2, wherein the voltage-current converter is adjusted by a dummy circuit corresponding to the correction current synthesizer, the dummy circuit comprising a third resistor corresponding to the first and second resistors, a sixth transistor corresponding to the third and fourth transistors, and a fourth resistor carrying a sixth current corresponding to the correction current.

5. The correcting circuit according to claim 1, wherein the current adjuster comprises a weighted current mirror D/A converter.

6. The correcting circuit according to claim 1, wherein the correction voltage generator comprises:

a current reversing circuit, which includes a current mirror circuit comprising an input coupled to an output of the current adjuster and switches switching a direction of the determining current; and a current-voltage converter converting the determining current to the correction voltage.

7. The correcting circuit according to claim 2, wherein the differential pair includes a pair of transistors to which the differential input voltage is input, wherein each source of the pair of transistors is coupled in series with a transistor group made up of a plurality of transistors; and wherein each back gate of the pair of transistors and the transistors in the transistor group is coupled to the source of the pair of transistors.

8. A correcting method comprising:

adjusting an offset so that a voltage signal output in correspondence with an output signal from a sensor is corrected when a physical quantity that is to be a reference is applied to the sensor;

adjusting a gain so that a voltage signal output in correspondence with the output signal of the sensor is a voltage corresponding to the physical quantity when the physical quantity is applied to the sensor;

selecting a correction voltage characteristic so that an output characteristic of the voltage signal approaches linear; and adjusting a correction amount.

9. The correcting method according to claim 8, wherein when the characteristic of the correction voltage is selected, the output characteristic of the voltage signal, prior to correction, is approximated by a quadratic function in order to select the correction voltage.

10. A sensor apparatus comprising:

a sensor signal-voltage converter for voltage converting an output signal of a sensor;

a voltage amplifier amplifying the voltage obtained by the sensor signal-voltage converter;

a voltage-current converter converting the output voltage of the voltage amplifier to a current;

a correction current synthesizer synthesizing a correction current based on the output current of the voltage-current converter;

a current adjuster adjusting a determining current which corresponds to a correction amount based on the correction current;

a correction voltage generator generating a correction voltage based on the determining current obtained by the current adjuster, wherein the correction voltage correcting the output voltage of the voltage amplifier so that an output characteristic of a voltage signal approaches linear; and an output buffer amplifier outputting, as the voltage signal, a voltage resulting from the correction of the output voltage of the voltage amplifier using the correction voltage.

11. The sensor apparatus according to claim 10 further comprising:

a memory adapted to correction information, wherein the output characteristic of the voltage signal is corrected by supplying bit information as the correction information.

* * * * *